US010639933B2

(12) United States Patent
Ikeda

(10) Patent No.: US 10,639,933 B2
(45) Date of Patent: May 5, 2020

(54) RUBBER COMPOSITION FOR TREADS AND PNEUMATIC TIRE

(71) Applicant: SUMITOMO RUBBER INDUSTRIES, LTD., Kobe-shi, Hyogo (JP)

(72) Inventor: Keiji Ikeda, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 23 days.

(21) Appl. No.: 15/786,934

(22) Filed: Oct. 18, 2017

(65) Prior Publication Data

US 2018/0134080 A1 May 17, 2018

(30) Foreign Application Priority Data

Nov. 16, 2016 (JP) ................................ 2016-223279
Aug. 28, 2017 (JP) ................................ 2017-163350

(51) Int. Cl.

| | |
|---|---|
| ***B60C 1/00*** | (2006.01) |
| ***C08F 136/06*** | (2006.01) |
| ***C08L 9/06*** | (2006.01) |
| ***C08L 9/00*** | (2006.01) |
| ***C08L 7/00*** | (2006.01) |
| *C08F 36/08* | (2006.01) |
| *C08F 36/06* | (2006.01) |

(52) U.S. Cl.

CPC .......... *B60C 1/0016* (2013.01); *C08F 136/06* (2013.01); *C08L 7/00* (2013.01); *C08L 9/00* (2013.01); *C08L 9/06* (2013.01); *C08F 36/06* (2013.01); *C08F 36/08* (2013.01); *C08F 2500/04* (2013.01); *C08L 2201/50* (2013.01); *C08L 2205/02* (2013.01)

(58) Field of Classification Search

CPC .. B60C 1/0016; C08F 136/06; C08F 2500/04; C08F 36/06; C08F 36/08; C08L 9/00; C08L 9/06; C08L 2201/50; C08L 2205/02; C08L 7/00

See application file for complete search history.

(56) References Cited

U.S. PATENT DOCUMENTS

| | | | | |
|---|---|---|---|---|
| 8,362,118 B2 * | 1/2013 | Mihara | ................. | B60C 1/0016 524/492 |
| 2005/0209413 A1 * | 9/2005 | Labauze | .............. | C08K 5/0016 525/333.3 |
| 2010/0179274 A1 * | 7/2010 | Jinbo | ...................... | C08L 35/06 524/516 |
| 2014/0155520 A1 * | 6/2014 | Takeda | .................. | B60C 1/0016 523/156 |
| 2017/0015766 A1 * | 1/2017 | Ambe | ..................... | C08F 36/06 |

FOREIGN PATENT DOCUMENTS

| | | |
|---|---|---|
| JP | 2013-53296 A | 3/2013 |
| WO | WO-2015151625 A1 * | 10/2015 |

* cited by examiner

*Primary Examiner* — Irina S Zemel
*Assistant Examiner* — Jeffrey S Lenihan
(74) *Attorney, Agent, or Firm* — Birch, Stewart, Kolasch & Birch, LLP

(57) ABSTRACT

Provided are a rubber composition for treads which achieves a balanced improvement in fuel economy, abrasion resistance, and wet grip performance while offering good processability, and a pneumatic tire formed from the rubber composition. The present invention relates to a rubber composition for treads containing: a polybutadiene; and a terpene resin having a glass transition temperature (Tg) of 40° C. to 90° C., the polybutadiene satisfying the following conditions (A), (B) and (C): (A) a ratio (Tcp/$ML_{1+4}$, 100° C.) of 5% by mass toluene solution viscosity (Tcp) to Mooney viscosity ($ML_{1+4}$, 100° C.) is 0.9 to 2.3; (B) a stress relaxation time (T80) is 10.0 to 40.0 seconds, which is a time required for torque to decay by 80%, where 100% represents torque at the end of a $ML_{1+4}$, 100° C. measurement; and (C) a molecular weight distribution (Mw/Mn) is 2.50 to 4.00.

4 Claims, No Drawings

RUBBER COMPOSITION FOR TREADS AND PNEUMATIC TIRE

TECHNICAL FIELD

The present invention relates to a rubber composition for treads and a pneumatic tire formed from the rubber composition.

BACKGROUND ART

Treads are required to have different properties such as rubber properties (e.g. fuel economy, abrasion resistance, wet grip performance) and processability. Various attempts have been made to improve these properties of the treads. For example, in order to improve fuel economy, abrasion resistance, and wet grip performance, it has been proposed to use a terminally modified rubber, a high molecular weight polymer, and a high glass transition temperature polymer, respectively. These methods, however, have problems such as an increase in the hardness of the rubber composition leading to deterioration of the processability. Thus, it is generally difficult to simultaneously achieve these properties.

Patent Literature 1 proposes a technique of improving fuel economy, abrasion resistance, and wet grip performance by the use of a liquid resin having a softening point of −20° C. to 45° C. and a specific silica. However, there is still room for improvement.

There has been a recent demand for further improved properties, and a need exists to achieve a further balanced improvement in fuel economy, abrasion resistance, and wet grip performance while offering good processability.

CITATION LIST

Patent Literature

Patent Literature 1: JP 2013-053296 A

SUMMARY OF INVENTION

Technical Problem

The present invention aims to solve the above problem and provide a rubber composition for treads which achieves a balanced improvement in fuel economy, abrasion resistance, and wet grip performance while offering good processability, and also provide a pneumatic tire formed from the rubber composition.

Solution to Problem

The present invention relates to a rubber composition for treads, containing:

a polybutadiene; and a terpene resin having a glass transition temperature (Tg) of 40° C. to 90° C., the polybutadiene satisfying the following conditions (A), (B), and (C): (A) a ratio ($Tcp/ML_{1+4}$, 100° C.) of 5% by mass toluene solution viscosity (Tcp) to Mooney viscosity ($ML_{1+4}$, 100° C.) is 0.9 to 2.3; (B) a stress relaxation time (T80) is 10.0 to 40.0 seconds, which is a time required for torque to decay by 80%, where 100% represents torque at the end of a $ML_{1+4}$, 100° C. measurement; and (C) a molecular weight distribution (Mw/Mn) is 2.50 to 4.00.

Preferably, the rubber composition contains the polybutadiene in an amount of 5% to 90% by mass based on 100% by mass of a rubber component in the rubber composition, and the terpene resin in an amount of 1 to 20 parts by mass per 100 parts by mass of the rubber component.

Preferably, the rubber composition contains an additional rubber other than the polybutadiene rubber in an amount of 10% to 95% by mass based on 100% by mass of the rubber component, and silica in an amount of 10 to 100 parts by mass per 100 parts by mass of the rubber component.

The present invention also relates to a pneumatic tire, including a tread formed from the rubber composition described above.

Advantageous Effects of Invention

The rubber composition for treads of the present invention contains a polybutadiene satisfying the above conditions (A), (B), and (C) and a terpene resin having a predetermined Tg. Such a rubber composition can achieve a balanced improvement in fuel economy, abrasion resistance, and wet grip performance while offering good processability.

DESCRIPTION OF EMBODIMENTS

The rubber composition for treads of the present invention contains a polybutadiene, and a terpene resin having a glass transition temperature (Tg) of 40° C. to 90° C. The polybutadiene satisfies the following conditions (A), (B), and (C): (A) the ratio ($Tcp/ML_{1+4}$, 100° C.) of 5% by mass toluene solution viscosity (Tcp) to Mooney viscosity ($ML_{1+4}$, 100° C.) is 0.9 to 2.3; (B) the stress relaxation time (T80) is 10.0 to 40.0 seconds, which is the time required for the torque to decay by 80%, where 100% represents the torque at the end of the $ML_{1+4}$, 100° C. measurement; and (C) the molecular weight distribution (Mw/Mn) is 2.50 to 4.00.

It is generally difficult for treads to achieve a balanced improvement in fuel economy, abrasion resistance, and wet grip performance while offering good processability because these properties have a trade-off relationship. In the present invention, the combined use of a specific polybutadiene that satisfies all conditions (A), (B), and (C) and a terpene resin having a predetermined Tg solves the above problem.

This is presumably because the use of the specific polybutadiene makes it possible to achieve excellent silica dispersibility, rolling resistance, abrasion resistance, and wet grip performance while exhibiting good kneading processability, and further the use of the terpene resin makes it possible to drastically improve wet grip performance while maintaining other properties which are ordinarily difficult to simultaneously achieve; therefore, it is possible to achieve a balanced improvement in fuel economy, abrasion resistance, and wet grip performance while offering good processability. Thus, the combined use of both components synergistically improves the balance of fuel economy, abrasion resistance, and wet grip performance while offering good processability.

(Polybutadiene)

The polybutadiene has (A) a ratio ($Tcp/ML_{1+4}$, 100° C.) of 5% by mass toluene solution viscosity (Tcp) to Mooney viscosity ($ML_{1+4}$, 100° C.) of 0.9 to 2.3, preferably 0.9 to 1.7, more preferably 1.2 to 1.7, still more preferably 1.4 to 1.7. The ratio is a measure of the degree of branching of polybutadiene. A higher ratio indicates a lower degree of branching of polybutadiene, i.e., a higher linearity. At a ratio of 0.9 or higher, the rubber vulcanizate tends to have a reduced tan δ and good fuel economy. At a ratio of 2.3 or lower, good processability tends to be obtained.

The Mooney viscosity ($ML_{1+4}$, 100° C.) of the polybutadiene is preferably 43 to 70, more preferably 48 to 70, still more preferably 50 to 67. With a Mooney viscosity of 43 or higher, good abrasion resistance tends to be obtained. With a Mooney viscosity of 70 or lower, good processability tends to be obtained.

Tcp and $ML_{1+4}$, 100° C. are determined as described later in EXAMPLES.

The toluene solution viscosity (Tcp) of the polybutadiene is preferably 42 to 160, more preferably 55 to 135, still more preferably 68 to 120. With a. Tcp of 42 or higher, abrasion resistance is further improved. With a Tcp of 160 or lower, processability is further improved.

The polybutadiene has (B) a stress relaxation time (T80) of 10.0 to 40.0 seconds, preferably 11.0 to 26.0 seconds, more preferably 12.0 to 20.0 seconds, which is the time required for the torque to decay by 80%, where 100% represents the torque at the end of the $ML_{1+4}$, 100° C. measurement. With a T80 of 10.0 seconds or more, retention of the shear stress tends to be sufficient, resulting in a good filler dispersion. With a T80 of 40.0 seconds or less, good processability tends to be obtained. The stress relaxation of rubber is a combination of elastic and viscous responses. A slow rate of relaxation indicates a higher elastic component in the overall response, whereas a rapid rate of relaxation indicates a higher viscous component.

T80 is determined as described later in EXAMPLES.

The polybutadiene has (C) a molecular weight distribution (Mw/Mn) of 2.50 to 4.00, preferably 2.60 to 3.60, more preferably 2.70 to 3.20. With a Mw/Mn of 2.50 or more, good processability tends to be obtained, while with a Mw/Mn of 4.00 or less, good abrasion resistance tends to be obtained.

The weight average molecular weight (Mw) of the polybutadiene is preferably $40.0\times10^4$ to $75.0\times10^4$, more preferably $46.0\times10^4$ to $65.0\times10^4$, still more preferably $52.0\times10^4$ to $62.0\times10^4$. With a Mw equal to or more than the lower limit, good abrasion resistance tends to be obtained, while with a Mw equal to or less than the upper limit, good processability tends to be obtained.

Mw and Mn are determined by gel permeation chromatography (GPC) calibrated with polystyrene standards.

The number average molecular weight (Mn) of the polybutadiene is preferably $12.5\times10^4$ to $30.0\times10^4$, more preferably $16.0\times10^4$ to $23.0\times10^4$, still more preferably $17.0\times10^4$ to $20.3\times10^4$. With a Mn equal to or more than the lower limit, good abrasion resistance tends to be obtained, while with a Mn equal to or less than the upper limit, good processability tends to be obtained.

The cis-structure content determined by microstructural analysis of the polybutadiene is preferably 98 mol % or less, and is more preferably 94.0 to 97.8 mol %, still more preferably 95.0 to 97.6 mol %. With a cis-structure content of 98 mol % or less, sufficient branched polymer chains are provided so that a desired stress relaxation time can be easily obtained. However, if the cis-structure content is excessively low, abrasion resistance tends to decrease.

The vinyl structure content determined by microstructural analysis of the polybutadiene is preferably 2 mol % or less, more preferably 1.8 mol % or less. When the vinyl structure content determined by microstructural analysis is 2 mol % or less, the polybutadiene has good molecular mobility and the vulcanizate has good dynamic viscoelastic tan δ. Although a vinyl structure content determined by microstructural analysis that is as low as possible is preferred, the content may be 1.0 mol % or more, for example.

The trans-structure content determined by microstructural analysis of the polybutadiene is preferably 2.0 mol % or less, more preferably 1.6 mol % or less, still more preferably 1.3 mol % or less. With a trans-structure content of 2.0 mol % or less, abrasion resistance is further improved. Although a trans-structure content determined by microstructural analysis that is as low as possible is preferred, the content may be 1.0 mol % or more, for example.

The microstructural contents are determined as described later in EXAMPLES.

The amount of the polybutadiene based on 100% by mass of the rubber component is preferably 5% by mass or more, more preferably 10% by mass or more, still more preferably 15% by mass or more. The amount is preferably 90% by mass or less, more preferably 50% by mass or less, still more preferably 40% by mass or less. When the amount is within the range indicated above, a balanced improvement in kneading processability, silica dispersibility, rolling resistance, wet grip performance, and abrasion resistance tends to be achieved. In this case, the rubber component preferably includes 10% to 95% by mass of an additional rubber.

(Method for Producing Polybutadiene)

The polybutadiene used in the present invention can be produced using a catalyst system including a transition metal catalyst, an organic aluminum compound, and water.

The transition metal catalyst may suitably be a cobalt catalyst. Examples of the cobalt catalyst include cobalt salts such as cobalt chloride, cobalt bromide, cobalt nitrate, cobalt octylate (ethylhexanoate), cobalt naphthenate, cobalt acetate, and cobalt malonate; bis(acetylacetonato)cobalt, tris (acetylacetonato)cobalt, (ethylacetoacetato)cobalt, and organic base complexes (e.g. pyridine complexes and picoline complexes) or ethyl alcohol complexes of cobalt salts. Preferred among these is cobalt octylate (ethylhexanoate). As long as the resulting polybutadiene has the properties described above, other catalysts such as neodymium or nickel catalysts may be used.

The amount of the transition metal catalyst used may be appropriately adjusted so that the polybutadiene has a desired Mooney viscosity.

Examples of the organic aluminum compound include trialkylaluminums; halogen-containing organic aluminum compounds such as dialkylaluminum chlorides, dialkylaluminum bromides, alkylaluminum sesquichlorides, alkylaluminum sesquibromides, alkylaluminum dichlorides, and alkylaluminum dibromides; and hydrogenated organic aluminum compounds such as dialkylaluminum hydrides and alkylaluminum sesquihydrides. These organic aluminum compounds may be used alone, or two or more of these may be used in combination.

Specific examples of the trialkylaluminums include trimethylaluminum, triethylaluminum, triisobutylaluminum, trihexylaluminum, trioctylaluminum, and tridecylaluminum.

Examples of the dialkylaluminum chlorides include dimethylaluminum chloride and diethylaluminum chloride. Examples of the dialkylaluminum bromides include dimethylaluminum bromide and diethylaluminum bromide. Examples of the alkylaluminum sesquichlorides include methylaluminum sesquichloride and ethylaluminum sesquichloride. Examples of the alkylaluminum sesquibromides include methylaluminum sesquibromide and ethylaluminum sesquibromide. Examples of the alkylaluminum dichlorides include methylaluminum dichloride and ethylaluminum dichloride. Examples of the alkylaluminum dibromides include methylaluminum dibromide and ethylaluminum dibromide.

Examples of the dialkylaluminum hydrides include diethylaluminum hydride and diisobutylaluminum hydride. Examples of the alkylaluminum sesquihydrides include ethylaluminum sesquihydride and isobutylaluminum sesquihydride.

As for the mixing ratio between the organic aluminum compound and water, the aluminum/water ratio (molar ratio) is preferably 1.5 to 3, more preferably 1.7 to 2.5, because a polybutadiene having a desired T80 is easily obtained.

Further, in order to provide a desired Mooney viscosity to the polybutadiene, a molecular weight modifier may be used. Examples include non-conjugated dienes such as cyclooctadiene, allene, and methylallene (1,2-butadiene); and α-olefins such as ethylene, propylene, and 1-butene. These molecular weight modifiers may be used alone, or two or more of these may be used in combination.

Polymerization may be carried out by any method, such as by bulk polymerization in which a conjugated diene monomer such as 1,3-butadiene serving as a polymerization solvent is polymerized or by solution polymerization in which monomers dissolved in a solvent are polymerized. Examples of the solvent used in the solution polymerization include aromatic hydrocarbons such as toluene, benzene, and xylene; saturated aliphatic hydrocarbons such as n-hexane, butane, heptane, and pentane; alicyclic hydrocarbons such as cyclopentane and cyclohexane; olefinic hydrocarbons such as cis-2-butene and trans-2-butene; petroleum solvents such as mineral spirits, solvent naphtha, and kerosene; and halogenated hydrocarbons such as methylene chloride. Preferred among these are toluene, cyclohexane, and a solvent mixture of cis-2-butene and trans-2-butene.

The polymerization temperature preferably ranges from −30° C. to 150° C., more preferably from 30° C. to 100° C. In order to easily obtain a polybutadiene having a desired T80, the polymerization temperature is still more preferably 70° C. to 80° C. The polymerization time preferably ranges from 1 minute to 12 hours, more preferably from 5 minutes to 5 hours.

After the polymerization reaction reaches a predetermined polymerization rate, an antioxidant may be added as needed. Examples of the antioxidant include phenolic antioxidants such as 2,6-di-tert-butyl-p-cresol (BHT), phosphorus antioxidants such as trinonylphenyl phosphite (TNP), and sulfur antioxidants such as 4,6-bis(octylthiomethyl)-o-cresol and dilauryl-3,3'-thiodipropionate (TPL). These antioxidants may be used alone, or two or more of these may be used in combination. The amount of the antioxidant added is preferably 0.001 to 5 parts by mass per 100 parts by mass of the polybutadiene.

After polymerization is performed for a predetermined time, the pressure inside the polymerization vessel may be released, as needed, and then posttreatment steps such as washing and drying may be performed, whereby a polybutadiene having desired properties can be produced.

The polybutadiene may be a product produced or sold by, for example, Ube Industries, Ltd. or Lanxess.

In the present invention, the rubber component may include an additional rubber in addition to the polybutadiene. Examples of the additional rubber include diene rubbers such as natural rubber (NR), polyisoprene rubber (IR), another polybutadiene rubber (BR), styrene-butadiene rubber (SBR), styrene-isoprene rubber (SIR), styrene-isoprene-butadiene rubber (SIBR), ethylene-propylene-diene rubber (EPDM), chloroprene rubber (CR), acrylonitrile butadiene rubber (NBR), and butyl rubber (IIR). These rubbers may be used alone, or two or more of these may be used in combination. In order to well achieve the effects of the present invention, SBR is preferred among these.

In cases where the rubber component contains SBR, the amount of SBR based on 100% by mass of the rubber component is preferably 5% by mass or more, more preferably 10% by mass or more, still more preferably 50% by mass or more, further preferably 60% by mass or more. When the amount is 5% by mass or more, good abrasion resistance and good wet grip performance tend to be obtained. The amount is preferably 95% by mass or less, more preferably 90% by mass or less. When the amount is 95% by mass or less, good low heat build-up properties tend to be obtained.

The SBR may be a product produced or sold by, for example, JSR Corporation, Sumitomo Chemical Co., Ltd., or Zeon Corporation The rubber composition of the present invention contains a terpene resin having a glass transition temperature (Tg) of 40° C. to 90° C. The Tg is preferably 45° C. to 80° C., more preferably 50° C. to 70° C. When the Tg is adjusted within the range indicated above, wet grip performance tends to be greatly improved, resulting in a significantly improved balance of the properties.

The Tg refers to a value (midpoint glass transition temperature) measured with a differential scanning calorimeter (Q200, TA Instruments Japan) at a temperature increase rate of 10° C./min in accordance with JIS K 7121.

The terpene resin preferably has a weight average molecular weight (Mw) of 500 or more, more preferably 1,000 or more, still more preferably 1,500 or more. The weight average molecular weight is also preferably 10,000 or less, more preferably 5,000 or less, still more preferably 3,500 or less. When the Mw is adjusted within the range indicated above, wet grip performance tends to be greatly improved, resulting in a significantly improved balance of the properties.

The amount of the terpene resin per 100 parts by mass of the rubber component is preferably 1 part by mass or more, more preferably 3 parts by mass or more, still more preferably 5 parts by mass or more. The amount is also preferably 20 parts by mass or less, more preferably 18 parts by mass or less, still more preferably 15 parts by mass or less. When the amount is 1 part by mass or more, good fuel economy and good processability tend to be obtained. When the amount is 20 parts by mass or less, good abrasion resistance tends to be obtained.

Examples of the terpene resin include polyterpene resins produced by polymerization of terpene compounds, and aromatic modified terpene resins produced by polymerization of terpene compounds and aromatic compounds. Hydrogenated products of these resins may also be used.

Polyterpene resins refer to resins produced by polymerization of terpene compounds. Terpene compounds refer to hydrocarbons having a composition represented by $(C_5H_8)_n$ or oxygen-containing derivatives thereof, which are terpene skeleton-having compounds classified into monoterpenes ($C_{10}H_{16}$) sesquiterpenes ($C_{15}H_{24}$), diterpenes ($C_{20}H_{32}$), and other terpenes. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include resins made from the aforementioned terpene compounds, such as pinene resins, limonene resins, dipentene resins, and pinene-limonene resins. Preferred among these are pinene resins. Pinene resins, which usually contain two isomers—α-pinene and β-pinene—, are classified into β-pinene resins mainly containing β-pinene and α-pinene resins mainly containing α-pinene according to the components present in the resin.

Examples of the aromatic modified terpene resins include terpene phenol resins made from the terpene compounds and phenol compounds, and terpene styrene resins made from the terpene compounds and styrene compounds. Terpene phenol styrene resins made from the terpene compounds, phenol compounds, and styrene compounds may also be used.

In order to well achieve the effects of the present invention, the terpene resin is preferably a polyterpene resin, more preferably a β-pinene resin.

The terpene resin may be a product produced or sold by, for example, Yasuhara Chemical Co., Ltd. or Kraton Corporation.

The rubber composition of the present invention preferably contains silica in order to well achieve the effects of the present invention.

The silica preferably has a nitrogen adsorption specific surface area ($N_2SA$) of 100 $m^2/g$ or more, more preferably 150 $m^2/g$ or more. The $N_2SA$ is also preferably 300 $m^2/g$ or less, more preferably 200 $m^2/g$ or less. With a $N_2SA$ of 100 $m^2/g$ or more, good abrasion resistance tends to be obtained, while with a $N_2SA$ of 300 $m^2/g$ or less, good silica dispersion and good fuel economy tend to be obtained.

The $N_2SA$ of the silica can be measured in accordance with ASTM D 3037-81.

The amount of silica per 100 parts by mass of the rubber component is preferably 10 parts by mass or more, more preferably 30 parts by mass or more, still more preferably 50 parts by mass or more. The amount is preferably 100 parts by mass or less, more preferably 90 parts by mass or less. When the amount is 10 parts by mass or more, good fuel economy and good abrasion resistance tend to be obtained. When the amount is 100 parts by mass or less, good silica dispersion and good processability tend to be obtained.

The rubber composition of the present invention preferably contains a silane coupling agent together with silica.

Examples of the silane coupling agent include sulfide silane coupling agents such as bis(3-triethoxysilylpropyl) tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Preferred among these are sulfide silane coupling agents, with bis(3-triethoxysilylpropyl)tetrasulfide being more preferred. The amount of the silane coupling agent is preferably 1 to 20 parts by mass per 100 parts by mass of silica.

In view of properties such as abrasion resistance and wet grip performance, the rubber composition of the present invention preferably contains carbon black.

The carbon black preferably has a nitrogen adsorption specific surface area ($N_2SA$) of 80 $m^2/g$ or more, more preferably 100 $m^2/g$ or more. The $N_2SA$ is preferably 200 $m^2/g$ or less, more preferably 150 $m^2/g$ or less. With a $N_2SA$ of 80 $m^2/g$ or more, good reinforcing properties and excellent abrasion resistance tend to be obtained, while with a $N_2SA$ of 200 $m^2/g$ or less, good carbon black dispersion and excellent fuel economy tend to be obtained.

The $N_2SA$ of the carbon black can be measured in accordance with JIS K 6217-2:2001.

The amount of carbon black per 100 parts by mass of the rubber component is preferably 1 part by mass or more, more preferably 3 parts by mass or more. The amount is also preferably 15 parts by mass or less, more preferably 10 parts by mass or less, still more preferably 8 parts by mass or less. When the amount is 1 part by mass or more, good abrasion resistance tends to be obtained. When the amount is 15 parts by mass or less, good fuel economy tends to be obtained.

In addition to the components described above, the rubber composition of the present invention may optionally incorporate other reinforcing fillers, antioxidants, oils, waxes, vulcanizing agents such as sulfur, vulcanization accelerators, and other components.

The pneumatic tire of the present invention can be produced using the rubber composition by usual methods.

Specifically, the unvulcanized rubber composition incorporating the components described above is extruded and processed into the shape of a tread and assembled with other tire components on a tire building machine in a usual manner to build an unvulcanized tire. The unvulcanized tire is heated and pressurized in a vulcanizer to obtain a tire.

The pneumatic tire of the present invention is suitable for passenger vehicles, large passenger vehicles, large SUVs, heavy load vehicles such as trucks and buses, and light trucks.

EXAMPLES

The present invention is specifically described with reference to, but not limited to, example below.

The chemicals used in the example and comparative examples are listed below.

SBR: commercial product of Zeon Corporation (solution-polymerized SBR terminally modified with N-methylpyrrolidone, styrene content=21% by mass, Tg=−25° C.)

BR 1 (polybutadiene): polybutadiene having the following properties: Tcp/$ML_{1+4}$, 100° C.=1.6, $ML_{1+4}$, 100° C.=67, T80=20.0 seconds, Mw/Mn=2.99, Mw=$52.9\times10^4$, cis-structure=97.6 mol %, vinyl structure=1.4 mol %, and trans-structure=1.3 mol % (Production Example 1 below)

BR 2: commercial product of Ube Industries, Ltd. (Tcp/$ML_{1+4}$, 100° C.=2.4, $ML_{1+4}$, 100° C.=42, T80=3.2 seconds, Mw/Mn=2.36, Mw=$49.8\times10^4$, cis-structure=98.1 mol %, vinyl structure=0.9 mol %, trans-structure=1.0 mol %)

BR 3: commercial product of Ube Industries, Ltd. (Tcp/$ML_{1+4}$, 100° C.=2.9, $ML_{1+4}$, 100° C.=44, T80=3.5 seconds, Mw/Mn=3.12, Mw=$57.4\times10^4$, cis-structure=97.8 mol %, vinyl structure=1.1 mol %, trans-structure=1.2 mol %)

Silica: ULTRASIL VN3 ($N_2SA$: 175 $m^2/g$) available from Degussa

Carbon black: SHOBLACK N220 ($N_2SA$: 111 $m^2/g$, DBP: 115 mL/100 g) available from Cabot Japan K.K.

Terpene resin: SYLVATRAXX 4150 (β-pinene resin, β-pinene content: 98% by mass or more, non-hydrogenated, Tg: 61° C., Mw: 2350, Mn: 830)

Oil: Diana Process AH-24 (aromatic process oil) available from Idemitsu Kosan Co., Ltd.

Silane coupling agent: Si69 (bis(3-triethoxysilyl-propyl) tetrasulfide) available from Degussa Wax: Sunnoc Wax available from Ouchi Shinko Chemical Industrial Co., Ltd.

Antioxidant: NOCRAC 6C (N-1,3-dimethylbutyl-N'-phenyl-p-phenylenediamine) available from Ouchi Shinko Chemical Industrial Co., Ltd.

Zinc oxide: zinc oxide #2 available from Mitsui Mining and Smelting Co., Ltd.

Stearic acid: stearic acid available from NOF Corporation

Sulfur: sulfur powder available from Tsurumi Chemical Industry Co., Ltd.

Vulcanization accelerator: Nocceler NS (N-tert-butyl-2-benzothiazolylsulfenamide) available from Ouchi Shinko Chemical Industrial Co., Ltd.

Production Example 1

A 1.5 L stainless steel reaction vessel equipped with a stirrer was purged with nitrogen gas and then charged with 1.0 L of a polymerization solution (34.2% by mass of butadiene (BD) and 31.2% by mass of cyclohexane (CH), with the balance being 2-butenes). Then, 1.52 mmol of water ($H_2O$), 2.08 mmol of diethylaluminum chloride (DEAC), 0.52 mmol of triethylaluminum (aluminum/water=1.71 (mixing molar ratio)), 20.94 μmol of cobalt octoate (Cocat), and 6.05 mmol of cyclooctadiene (COD) were added, and the mixture was stirred at 70° C. for 20 minutes to cause 1,4-cis polymerization. Then, ethanol containing 4,6-bis (octylthiomethyl)-o-cresol was added to terminate the polymerization. Unreacted butadiene and 2-butenes were evaporated and removed to obtain a polybutadiene (BR 1).

Example and Comparative Examples

According to the formulations shown in Table 1, the chemicals other than the sulfur and vulcanization accelerator were kneaded in a Banbury mixer at 150° C. for 5 minutes. To the kneaded mixture were added the sulfur and vulcanization accelerator, and they were kneaded using an open roll mill at 80° C. for 12 minutes to obtain an unvulcanized rubber composition.

The unvulcanized rubber composition was press-vulcanized at 170° C. for 20 minutes to obtain a vulcanized rubber composition.

The properties of the polybutadiene, and the Mooney viscosity index, rolling resistance index, wet grip index, and abrasion resistance index of the unvulcanized rubber compositions and vulcanized rubber compositions prepared as above were determined and evaluated as described below. The evaluation results are shown in Table 1.

(5% by Mass Toluene Solution Viscosity (Tcp))

The 5% by mass toluene solution viscosity (Tcp) of the polybutadiene was determined by dissolving 2.28 g of the polymer in 50 ml of toluene and measuring the solution using a Cannon-Fenske viscometer No. 400 at 25° C. The standard liquids used were standard liquids for calibrating viscometers (JIS Z 8809).

(Mooney Viscosity ($ML_{1+4}$, 100° C.))

The Mooney viscosity ($ML_{1+4}$, 100° C.) of the polybutadiene was measured at 100° C. according to JIS K 6300.

(Stress Relaxation Time (T80))

The stress relaxation time (T80) of the polybutadiene was determined by a stress relaxation measurement according to ASTM D 1646-7. Specifically, after the $ML_{1+4}$, 100° C. measurement was performed four minutes, the rotor was stopped. The torque at that point (0 seconds) is taken as 100%, and the time (in seconds) required for the torque to relax by 80%, i.e., to decay to 20%, was determined as the stress relaxation time (T80).

(Number Average Molecular Weight (Mn), Weight Average Molecular Weight (Mw), Molecular Weight Distribution (Mw/Mn))

The number average molecular weight (Mn), the weight average molecular weight (Mw), and the molecular weight distribution (Mw/Mn) of the polybutadiene were determined by GPC (trade name: HLC-8220, Tosoh Corporation) calibrated with polystyrene standards. The solvent used was tetrahydrofuran. Two serially connected Shodex columns KF-805L (trade name) were used, and a differential refractometer (RI) was used as the detector.

(Microstructures)

The microstructures of the polybutadiene were determined by infrared absorption spectrum analysis. Specifically, the microstructures of the polymer were determined from the ratio of the absorption intensities of the peak positions derived from the microstructures (cis: 740 $cm^{-1}$, vinyl: 910 $cm^{-1}$, trans: 967 $cm^{-1}$).

(Processability (Mooney Viscosity Index))

The Mooney viscosity of each unvulcanized rubber composition was measured at 100° C. in accordance with JIS K 6300. The Mooney viscosities ($ML_{1+4}$) are expressed as an index, with Comparative Example 1 set equal to 100. A higher index indicates better processability.

(Fuel Economy (Rolling Resistance Index))

Specimens of a predetermined size were cut out of each vulcanized rubber composition. The loss tangent (tan δ) at 60° C. of the vulcanized rubber sheets was measured at an initial strain of 10%, a dynamic strain of 2%, and a frequency of 10 Hz using a viscoelastic spectrometer available from Ueshima Seisakusho Co., Ltd. The tan δ values are expressed as an index using the below-described equation, with Comparative Example 1 set equal to 100. A higher index indicates better fuel economy.

(Rolling resistance index)=(tan δ of Comparative Example 1)/(tan δ of each formulation example)×100

(Wet Grip Index)

The viscoelastic parameter of specimens prepared from each vulcanized rubber composition was determined using a viscoelastometer (ARES) available from Rheometric Scientific in torsional mode. The tan δ was measured at 0° C., a frequency of 10 Hz, and a strain of 1%. The tan δ values are expressed as an index using the below-described equation, with Comparative Example 1 set equal to 100. A higher index indicates better wet grip performance.

(Wet grip index)=(tan δ of Comparative Example 1)/(tan δ of each formulation example)×100

(Abrasion Resistance Index)

The abrasion loss of each vulcanized rubber composition was measured with a Lambourn abrasion tester at room temperature, an applied load of 1.0 kgf, and a slip ratio of 30% and expressed as an index using the below-described equation. A higher index indicates better abrasion resistance.

(Abrasion resistance index)=(Abrasion loss of Comparative Example 1)/(Abrasion loss of each formulation example)×100

TABLE 1

| Rubber composition for treads | | | | | | |
|---|---|---|---|---|---|---|
| | Example | Comparative Example | | | | |
| | 1 | 1 | 2 | 3 | 4 | 5 |
| SBR | 80 | 80 | 80 | 80 | 80 | 80 |
| BR 1 (polybutadiene) | 20 | — | — | 20 | — | — |

TABLE 1-continued

| Rubber composition for treads | | | | | | |
|---|---|---|---|---|---|---|
| | Example | Comparative Example | | | | |
| | 1 | 1 | 2 | 3 | 4 | 5 |
| BR 2 | — | 20 | — | — | 20 | — |
| BR 3 | — | — | 20 | — | — | 20 |
| Silica (VN3) | 80 | 80 | 80 | 80 | 80 | 80 |
| Carbon black (N220) | 5 | 5 | 5 | 5 | 5 | 5 |
| Terpene resin (4150) | 10 | 10 | 10 | — | — | — |
| Oil | 10 | 10 | 10 | 20 | 20 | 20 |
| Silane coupling agent (Si69) | 6.4 | 6.4 | 6.4 | 6.4 | 6.4 | 6.4 |
| Wax | 2 | 2 | 2 | 2 | 2 | 2 |
| Antioxidant | 2 | 2 | 2 | 2 | 2 | 2 |
| Zinc oxide | 2.5 | 2.5 | 2.5 | 2.5 | 2.5 | 2.5 |
| Stearic acid | 2 | 2 | 2 | 2 | 2 | 2 |
| Sulfur | 2 | 2 | 2 | 2 | 2 | 2 |
| Vulcanization accelerator (NS) | 4 | 4 | 4 | 4 | 4 | 4 |
| Mooney viscosity index | 103 | 100 | 95 | 103 | 99 | 93 |
| Rolling resistance index | 102 | 100 | 98 | 102 | 100 | 99 |
| Wet grip index | 112 | 100 | 98 | 92 | 90 | 87 |
| Abrasion resistance index | 103 | 100 | 102 | 105 | 100 | 102 |

The results in Table 1 demonstrate that in the example in which a polybutadiene satisfying conditions (A), (B), and (C) and a terpene resin having a predetermined Tg were used in combination, the balance of fuel economy, abrasion resistance, and wet grip performance was synergistically improved while offering good processability as compared to the comparative examples in which neither of the two components was used, the comparative examples in which other polybutadienes were used, and the comparative example in which no terpene resin was added.

The invention claimed is:

1. A pneumatic tire, comprising a tread formed from a rubber composition for treads, the rubber composition comprising:

a polybutadiene; and a terpene resin having a glass transition temperature (Tg) of 50° C. to 70° C., the polybutadiene satisfying the following conditions (A), (B), and (C): (A) a ratio ($Tcp/ML_{1+4}$, 100° C.) of 5% by mass toluene solution viscosity (Tcp) to Mooney viscosity ($ML_{1+4}$, 100° C.) is 0.9 to 2.3; (B) a stress relaxation time (T80) is 10.0 to 40.0 seconds, which is a time required for torque to decay by 80%, where 100% represents torque at the end of a $ML_{1+4}$, 100° C. measurement; and (C) a molecular weight distribution (Mw/Mn) is 2.50 to 4.00, wherein the rubber composition comprises the polybutadiene in an amount of 10% to 40% by mass based on 100% by mass of a rubber component in the rubber composition, and the terpene resin in an amount of 5 to 15 parts by mass per 100 parts by mass of the rubber component, wherein the rubber composition further comprises silica in an amount of 50 to 90 parts by mass per 100 parts by mass of the rubber component, wherein the rubber composition further comprises styrene-butadiene rubber terminally modified with N-methylpyrrolidone in an amount of 10% to 95% 60% to 90% by mass based on 100% by mass of the rubber component.

2. The pneumatic tire according to claim 1, wherein the rubber composition comprises the polybutadiene in an amount of 15% to 40% by mass based on 100% by mass of the rubber component.

3. The pneumatic tire according to claim 1, wherein the polybutadiene satisfies the following conditions (A), (B), and (C): (A) a ratio ($Tcp/ML_{1+4}$, 100° C.) of 5% by mass toluene solution viscosity (Tcp) to Mooney viscosity ($ML_{1+4}$, 100° C.) is 1.4 to 1.7; (B) a stress relaxation time (T80) is 12.0 to 20.0 seconds, which is a time required for torque to decay by 80%, where 100% represents torque at the end of a $ML_{1+4}$, 100° C. measurement; and (C) a molecular weight distribution (Mw/Mn) is 2.70 to 3.20.

4. The pneumatic tire according to claim 1, wherein the terpene resin is at least one selected from the group consisting of polyterpene resin, aromatic modified terpene resin, and hydrogenated product thereof.

* * * * *